UNITED STATES PATENT OFFICE.

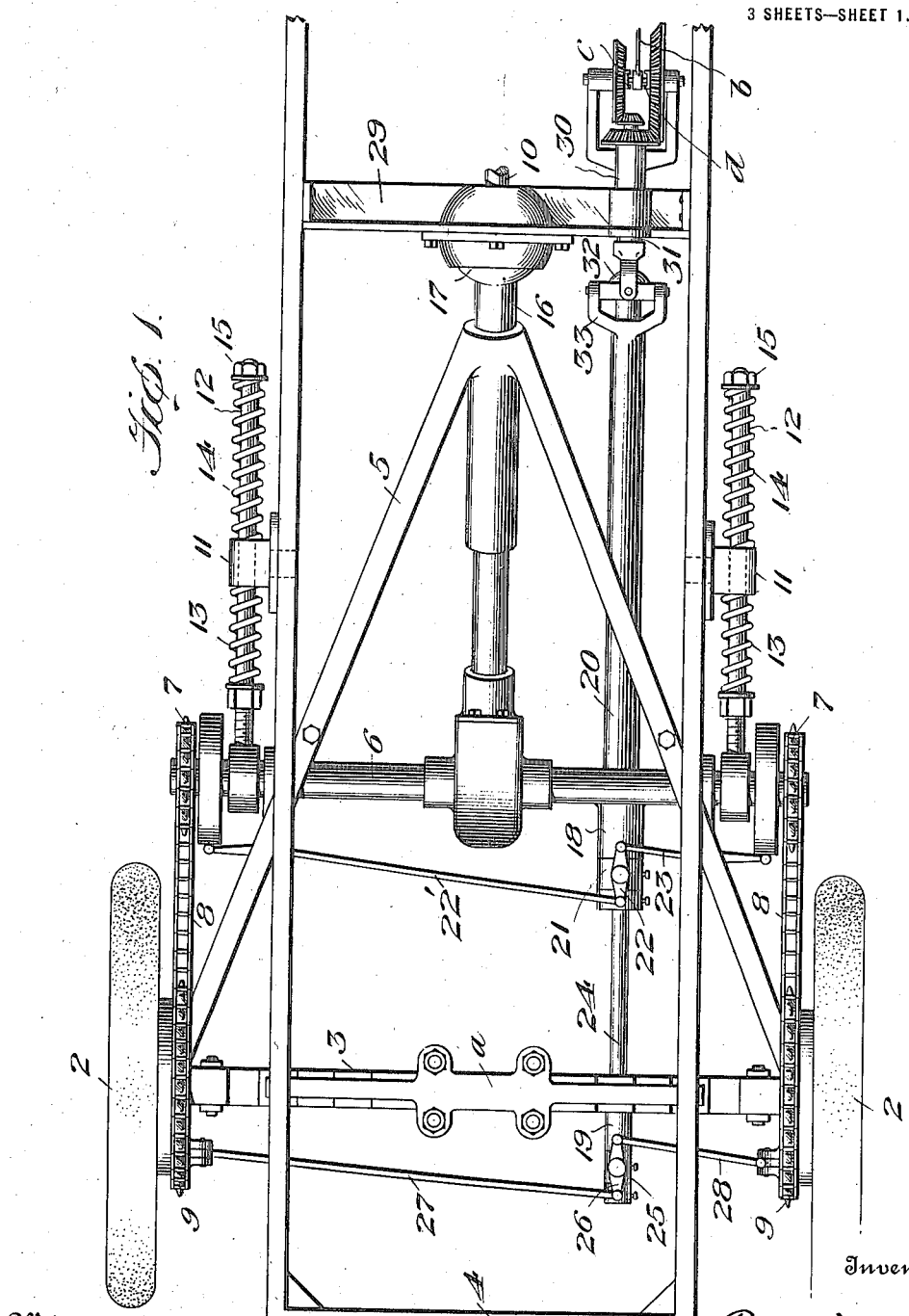

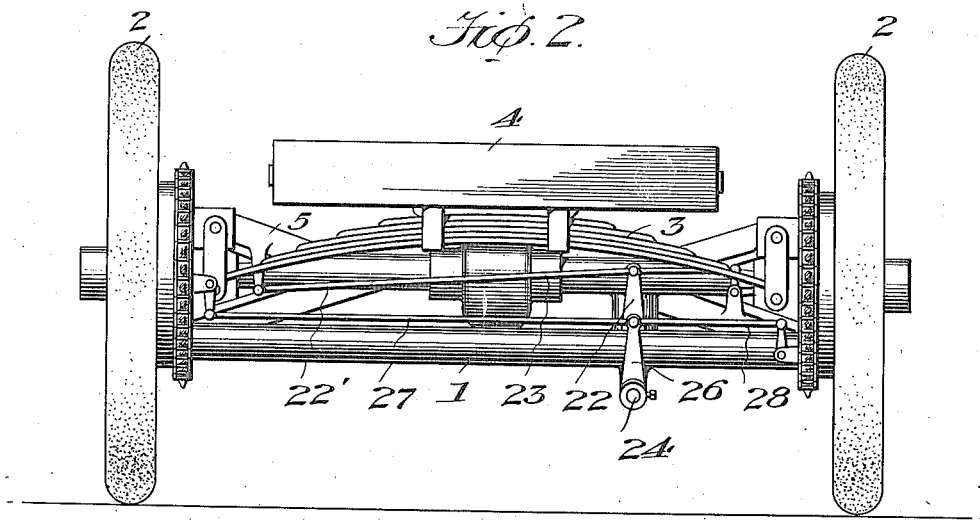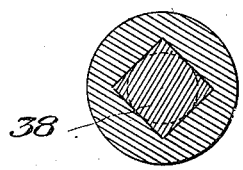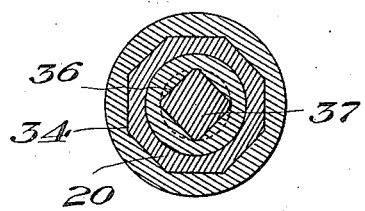

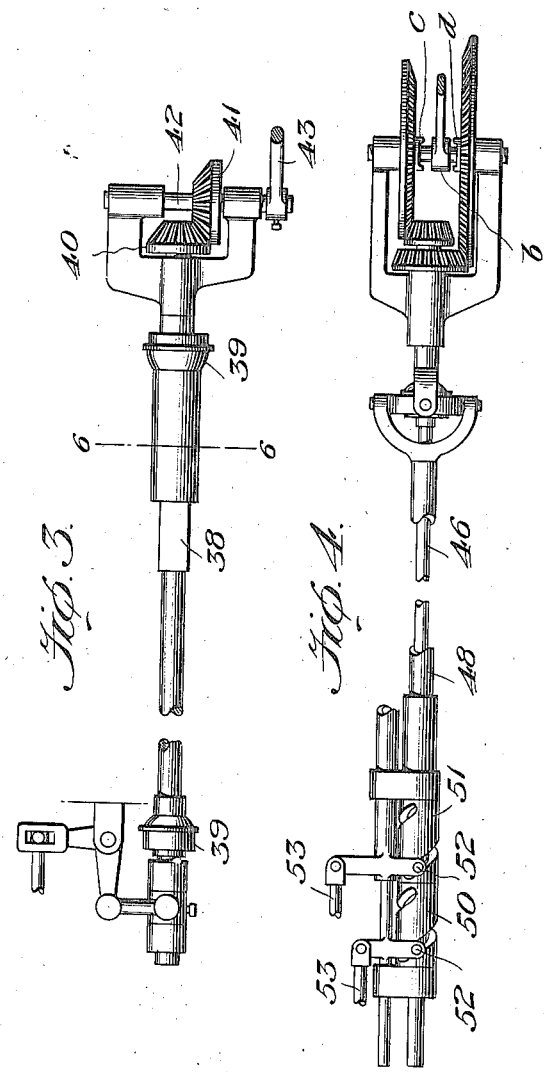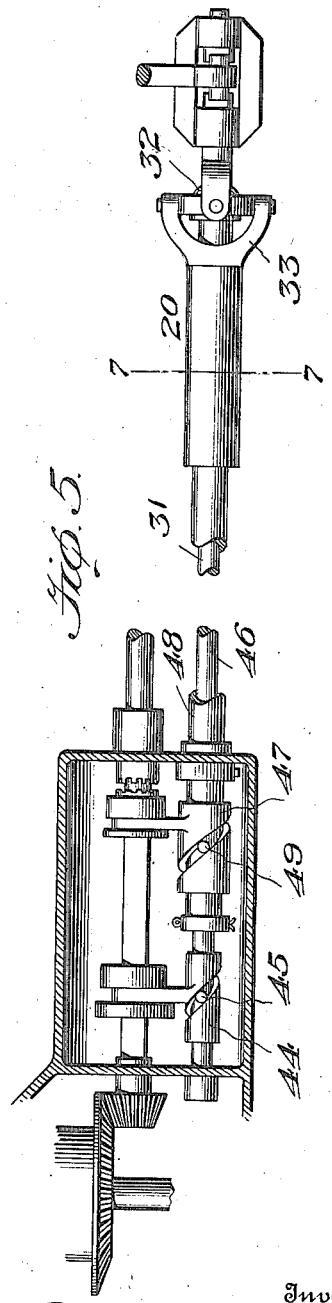

ROLLAND S. TROTT, OF DENVER, COLORADO.

CONTROL MECHANISM FOR MOTOR-VEHICLES.

1,221,925.     Specification of Letters Patent.     Patented Apr. 10, 1917.

Application filed March 6, 1913. Serial No. 752,391.

*To all whom it may concern:*

Be it known that I, ROLLAND S. TROTT, a citizen of the United States, residing in the city and county of Denver and State of Colorado, have invented certain new and useful Improvements in Control Mechanism for Motor-Vehicles, of which the following is a specification.

My invention relates to an improvement in control mechanism for motor vehicles and is designed to be used more particularly with a vehicle of a structure somewhat similar to that disclosed in Patents Nos. 1,029,730, 1,029,731 and 1,029,732, granted to me June 18, 1912.

In the present commercial motor vehicle with standard spring suspension, the control, that is steering, brakes, and transmission, is operated by rods which transmit a pull or thrust as desired by the operator in controlling the machine. In the braking and steering function a control of this structure when used with a spring suspension similar to that disclosed in the patents cited which permits of horizontal movement of the axle with respect to the frame on which the operating mechanism is mounted, would bring about impractical results.

In some adaptations of the structure disclosed in my patents it is desirable that the transmission be mounted on the rear axle or on the frame work or reach which is secured to move with the rear axle and is slidably connected with the frame and with this structure the same objection would arise.

My present invention consists of a two-part torsion rod, the two parts of which are extensibly connected together. The torsion rod is connected at one end to the means to be actuated which is mounted to move with the axle and at its other end connected with means secured to the frame whereby it may be revolved for operating the actuating means, and the object is to provide a mechanism which may be used with a structure as disclosed in my patented devices and which will accomplish a result fully as good as that obtained with the standard control mechanism used in connection with an axle connected with the frame in the usual manner.

The invention consists of certain novel features of construction and combinations of parts which will be hereinafter more fully described and pointed out in the claims.

In the accompanying drawings:—

Figure 1 is a view in top plan of the frame and the connected parts of a motor vehicle disclosing my control mechanism applied thereto;

Fig. 2 is a view in rear end elevation;

Figs. 3, 4 and 5 are views of slightly different forms which my invention may take;

Fig. 6 is a transverse sectional view on the line 6—6 of Fig. 3; and

Fig. 7 is a sectional view on the line 7—7 of Fig. 5.

In Figs. 1 and 2 I have shown the rear end of a motor vehicle. An axle 1 has the wheels 2, 2 mounted thereon in any approved manner, either to be revolved by the axle, or as disclosed in the present instance, to be of the so-called floating type. A spring 3, which in this instance is shown as being of the semi-elliptic type mounted longitudinally of the axle 1, has the frame 4 of the vehicle secured thereto and this spring is intended to absorb, to a great or lesser degree, the vertical shock transmitted to the wheels 2 by obstructions or irregularities on the road bed over which the vehicle is traveling.

A reach 5 which may be V-shaped in plan or of any other configuration, has its ends secured to the axle near the extremities thereof and is connected at its free end to have a sliding movement with the frame 4. In the present disclosure I have shown a jack shaft 6 carried by a reach 5 having spur gears 7, 7 on its ends which are connected by sprocket chains 8, 8 to the sprocket wheels 9, 9 connected to, and for driving, the wheels 2, 2. The jack shaft is intended to be driven by a drive shaft 10 which is connected with the engine and by suitable gears with the jack shaft.

Bearings 11, 11 are pivoted on the frame. Bolts 12, 12 connected to the reach 5 pass through the bearings 11 and on each side are provided with the shock rebound springs 13 and 14 the tension of which may be regulated by nuts 15 on the ends of the bolts 12. The drive shaft 10 is inclosed in a housing 16. The reach 5 has sliding connection on this housing thus permitting backward and forward movement of the axle 1, which movement is resiliently opposed by the springs 13 and 14. This longitudinal movement of the axle is permitted by the pivotal connection with the frame of the cross bar *a* to which the spring 3 is secured, and the oscillatory movement of the reach about its connection with the frame due to the flexion of the spring 3 is taken care of by the universal joint 17. In this instance I have shown brakes connected with hubs of the wheels 2 and with the spur gear on the jack shaft 6.

A bearing 18 is carried by the reach 5 and a bearing 19 by the axle 3. A tubular torsion tube 20 is mounted to be revolved in the bearing 18. A collar 21 is secured to the tube 20 and has an arm 22 carried thereby, on the outer end of which is mounted by a socket joint, a transverse equalizing link 21′, which transmits a pull or thrust as the arm is turned to the one side or the other to the connecting rods 22 and 23 for actuating the brakes mounted to operate in connection with the spur gear 7. A torsion rod 24 is mounted to revolve within the torsion tube 20 and the bearing 19 on the axle and has the collar 25 carrying arm 26 secured thereto by a socket joint, a transverse equalizing link 26′ for transmitting a pull and thrust to the connecting rods 27 and 28 which actuate the brakes connected with the wheels 2, 2 on the opposite ends of the axle 1. In a bearing formed on the cross bar 29 of the frame a torsion tube 30 is mounted to be revolved and the torsion shaft 31 is mounted in the tube 30 and is also capable of revolution. A universal joint 32 is connected to the shaft 31 adjacent the cross bar frame and inclosing the universal joint 32 is a universal joint 33 which is connected to the torsion tube 30. The free end of the joint 33 has a polysided socket 34 in which the end of the torsion rod 20 is fitted to have endwise sliding movement and to be revolved when the tube 30 is turned. The universal joint 32 has its free end journaled in the end of the torsion tube 20 and has a squared socket 36 in which the squared end 37 of the torsion rod 24 is received to have endwise sliding movement and to be revolved as the torsion shaft 31 is turned.

With the structure disclosed in Figs. 1 and 2 one set of brakes may be used under normal conditions and the second set as the emergency brakes. In this connection the operating means $b$ which may be a hand lever or pedal will be constructed to engage with either the clutch $c$ or clutch $d$ for operating one set of brakes.

In Fig. 3 I have disclosed a single torsion rod in which the slidable connection is formed at 38 and two universal joints 39, 39 are provided between the means for actuating the part to be operated and the beveled gear which are connected to the frame for operating the torsion rod. In this instance I have shown the beveled gear 40 connected with the torsion shaft and operated by a meshing gear 41 which is connected to a shaft 42 to be revolved by the lever 43 which may be extended to a position to be controlled by either the hand or foot of the operator.

In the form disclosed in Fig. 5 I have shown a spirally slotted collar 44 adapted to be held from revolution and moved endwise by a pin 45 carried by the torsion rod 46 and traveling in the slot as the rod is revolved. A collar 47 is received in the torsion tube 48 and is operated in the same manner as collar 44 by a pin 49 carried by the tube 48. These collars may, as in Fig. 5, be connected directly to the part to be actuated, or they may be connected by single or double links to the part to be operated.

The disclosure in Fig. 4 is very similar with the exception that the collars 50 and 51 are secured on the rod 46 and tube 48 respectively, and the pins 52, 52 carried by the actuating means 53 are moved forward and back as the spirally curved collars are revolved through the torsion rods 46 and 48. While I have discussed and described the structure in the several instances as applied to the brakes of the car, it is evident that this particular mechanism would be equally applicable to the steering mechanism where the front axle is connected to have movement longitudinally of the frame and for that matter that it can be used for the control of any parts which are connected so as to be movable with respect to the manual operating means carried by the frame. In this way I have provided a structure by which a motor vehicle may be made with springs of the utmost flexibility either horizontally or vertically and yet no possible inconvenience, strain or difficulty is encountered with the control of the car, even over the roughest roads, and when the axle is constantly changing its position, due to the obstructions in the road bed. It is of course understood that all slide joints will be made oil and dust proof, and the same will be true of the universal joints, and also that the sliding joints may be formed so that the opening may be either square or polysided, and that the structure may be changed to use a key or keys sliding in keyways and yet accomplish the same object.

It is evident that more or less slight changes might be made in the form and arrangement of the several parts herein set forth and described, and I do not wish to limit myself to the exact construction, but—

Having thus described my invention, what I claim as new and desire to secure by Letters Patent is—

1. In a motor vehicle having the axles mounted to have resilient movement in a direction parallel with the line of draft as well as the usual vertical movement, a control composed of an extensible torsion rod, means mounted on the frame for operating the torsion rod muscularly, and means connected to the torsion rod and mounted on the axle for transmitting movement to the part to be operated.

2. In a motor vehicle, a speed control composed of an extensible torsion rod, means mounted to move with the frame for operating the torsion rod manually, or pedally, and means mounted to move with the axle and connected to the torsion rod for transmitting movement or force to the part to be operated.

3. In a motor vehicle, a brake control composed of an extensible torsion rod, means on the frame for operating the torsion rod within the control of the operator, and means on the axle connected to the torsion rod to operate the brakes.

4. In a motor vehicle having the axles mounted to have resilient movement in a direction parallel with the line of draft, wheels mounted on the axles, means for actuating the wheels, and an extensible torsion rod connected at its one end with the actuating means and having its opposite end in a position to be controlled by the operator.

5. In a motor vehicle having the axles mounted to have resilient movement endwise of the frame, wheels mounted on the axles, actuating means mounted to move with the axles, an extensible torsion rod connected at its one end with the actuating means, and means connected with the opposite end and secured to the frame to be operated for controlling the actuating means.

6. In a motor vehicle having the axles mounted to have resilient movement endwise of the frame, wheels mounted on the axles, actuating means mounted to move with the axles, an extensible torsion rod connected at its one end with the actuating means, and means connected with the opposite end secured to the frame in position to be manually operated for revolving the torsion rod for controlling the actuating means.

7. In a motor vehicle having the axles mounted to have resilient movement endwise of the frame and the usual vertical movement, wheels mounted on the axles, actuating means mounted to move with the axles, a two-part torsion rod connected at its one end with the actuating means, means connected with the opposite end secured to the frame in position to be operated for revolving the torsion rod, an extensible connection between the two parts of the torsion rod and a universal joint in at least one of the parts.

8. In a motor vehicle having the axles mounted to have resilient movement in a direction parallel with the line of draft as well as the usual vertical movement, a speed control composed of an extensible torsion rod, means on the frame for operating the torsion rod within the control of the operator, and means on the axle connected to the torsion rod for transmitting movement or force to the part to be operated.

In testimony whereof I affix my signature, in the presence of two witnesses.

ROLLAND S. TROTT.

Witnesses:
J. R. WRENN,
ALEX AMAN.